United States Patent
Pasalich et al.

(10) Patent No.: US 11,939,476 B2
(45) Date of Patent: Mar. 26, 2024

(54) DRY DYE PAD FOR FISHING LURES

(71) Applicants: Francois L. Pasalich, Forney, TX (US); Jeanne L. Pasalich, Forney, TX (US)

(72) Inventors: Francois L. Pasalich, Forney, TX (US); Jeanne L. Pasalich, Forney, TX (US)

(*) Notice: Subject to any disclaimer, the term of this patent is extended or adjusted under 35 U.S.C. 154(b) by 854 days.

(21) Appl. No.: 16/996,220

(22) Filed: Aug. 18, 2020

(65) Prior Publication Data

US 2021/0051931 A1 Feb. 25, 2021

Related U.S. Application Data

(60) Provisional application No. 62/888,778, filed on Aug. 19, 2019.

(51) Int. Cl.
| | |
|---|---|
| *C09B 67/02* | (2006.01) |
| *A01K 85/00* | (2006.01) |
| *B29C 33/42* | (2006.01) |
| *B29C 39/00* | (2006.01) |
| *B29C 39/12* | (2006.01) |
| *B29C 39/24* | (2006.01) |
| *B29C 39/26* | (2006.01) |
| *B29K 27/06* | (2006.01) |
| *C09B 67/42* | (2006.01) |

(52) U.S. Cl.
CPC .......... *C09B 67/0097* (2013.01); *A01K 85/00* (2013.01); *B29C 33/42* (2013.01); *B29C 39/003* (2013.01); *B29C 39/12* (2013.01); *B29C 39/24* (2013.01); *B29C 39/26* (2013.01); *C09B 67/0092* (2013.01); *B29K 2027/06* (2013.01)

(58) Field of Classification Search
None
See application file for complete search history.

(56) References Cited

U.S. PATENT DOCUMENTS

| | | | | |
|---|---|---|---|---|
| 5,408,780 A | * | 4/1995 | Chambers, Sr. | ........ A01K 85/00 43/42.32 |
| 5,956,888 A | * | 9/1999 | Vreeland | ................ A01K 85/00 427/180 |
| 2007/0144054 A1 | * | 6/2007 | Warczok | ................ A01K 85/01 43/42.24 |

FOREIGN PATENT DOCUMENTS

EP 0014943 A1 * 9/1980 ............... B41C 3/04

* cited by examiner

*Primary Examiner* — Katie L. Hammer
(74) *Attorney, Agent, or Firm* — Sheri Higgins; Sheri Higgins Law, PLLC

(57) ABSTRACT

A dry dye pad for dyeing fishing lures can include: a dye; and a substrate comprising polymer particles suspended in a liquid plasticizer, wherein the substrate forms a permanently plasticized solid after heating and cooling. The substrate can be a plastisol. The plastisol can be heated and cooled to form the dye pad with the dye. The fishing lure can be dyed by contacting at least a portion of the fishing lure to a surface of the dry dye pad. The fishing lure can be dyed in as little as 1 to 3 seconds. The dry dye will not stain a user's skin. A stencil can be placed over the surface of the dry dye pad to create a dyed pattern on the fishing lure. The lure can be dyed with more than one color and patterns to create a lure that resembles bait or prey for fishing.

20 Claims, 3 Drawing Sheets

DRY DYE PAD FOR FISHING LURES

TECHNICAL FIELD

Fishing lures are commonly dyed in one or more of a variety colors. The colors can help attract fish. A dry dye pad is provided that can be used to die one or more parts of a lure without staining a person's hands or fingers or any areas near the dying process.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Fishing lures are used to try and catch a variety of fish. Fishing can occur in a variety of bodies of water including lakes, deep water, ponds, rivers, and streams. Fishing lures are made from a variety of materials, such as soft and hard plastics, rubber, metal, wood, cork, and synthetic or natural hair, fur, feathers, or other materials for fly fishing. Some fishing lures include more than one type of material.

It is desirable for fishing lures to have one or more colors in order to be attractive to fish. The coloring on the lure can also be in a pattern to represent, for example, scales or other features in order for the fishing lure to more accurately represent the desired lure. By way of example, a fishing lure to catch bass can be colored to look like a bait fish or a worm.

Some fishing lures are manufactured with a particular color scheme. However, it is becoming more common for fishing aficionados to dye their own fishing lures. Most dyes for fishing lures are in a liquid, liquid pen, or gel form. As used herein, a "liquid" is a substance having a continuous phase that can flow and conform to the outline of its container when the substance is tested at a temperature of 71° F. (22° C.) and a pressure of one atmosphere "atm" (0.1 megapascals "MPa"). A "gel" can be a liquid having an increased viscosity, but can also be considered a liquid so long as the gel can flow and conform to the outline of a container.

Liquid and gel dyes have several disadvantages, including, for example: it is hard to control the exact area on the fishing lure to dye because the liquid or gel dye tends to bleed or run; the dye commonly stains the user's hands and/or fingers during the dyeing process; and areas adjacent to the dyeing area can also become stained with the dye due to the flowable nature of the dye. Therefore, there is a need and an ongoing industry-wide concern for improved dyes for fishing lures that addresses all of the afore-mentioned disadvantages.

It has been discovered that a dry dye can be used for dyeing fishing lures. The dry dye will isolate the dye to the exact area(s) of the fishing lure to be dyed, will not stain the user's hands or fingers, and will not stain areas near the dyeing area. The dry dye pad also has a long life and can be used for more than one year.

A dry dye pad for dyeing fishing lures can include: a dye; and a substrate comprising polymer particles suspended in a liquid plasticizer, wherein the substrate forms a permanently plasticized solid after heating and cooling.

Figure 1:
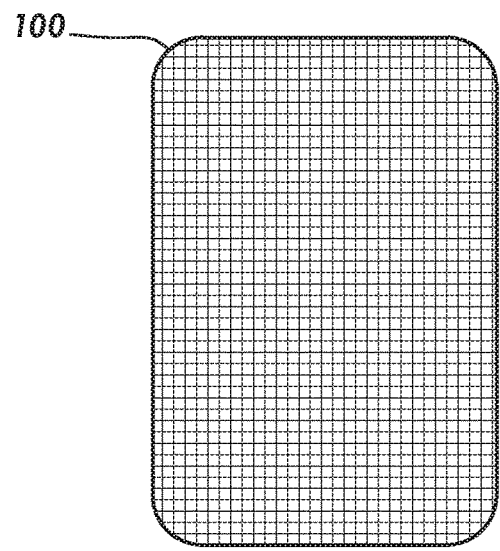
FIG. 1 is a top view of a dry dye pad with a colored dye according to certain embodiments.

Turning to the Figures, FIG. 1 shows a dye pad 100 having a single color for dyeing at least a portion of a fishing lure 130. A fishing lure is a type of artificial bait used to attract fish. Fishing lures come in a variety of shapes and sizes and can be selected based on the type of fish one desires to catch. The fishing lure can be made from a variety of materials, including, but not limited to, soft and hard plastics, silicone, rubber, metal, wood, cork, biodegradable materials, and synthetic or natural hair, fur, feathers, or other materials.

Some common types of fishing lures include: plugs, jigs, spinnerbait, spoons, soft plastics, and flies. Plugs or crankbaits are typically hard plastic fishing lures shaped and colored to resemble bait fish or other prey. Jigs are used predominately for bottom-feeding fish and have a weighted head on one side and a hook on the other with a feather skirt or plastic grub body. Spinnerbait lures are designed to move horizontally through the water and come in many shapes and colors depending on the targeted depth and species of fish. Spinnerbaits can include a skirted hook on one side, and one or more metal blades that spin like a propeller, on the other. The spinning of the metal blades creates vibration and color reflection, which can mimic minnows and other bait fish. Spinnerbaits can be used for catching species like bass, perch, and pike. Spoons are curved, concave metal lures. Soft plastic lures are flexible rubbery baits that imitate a variety of aquatic prey. The prey of soft plastic lures can be anything from minnows, worms, and crawfish to lizards and frogs. Soft plastic lures are frequently used for bass fishing. Flies are a type of fishing lure traditionally used in fly fishing and sometimes spin fishing. Fly fishing lures consist of just a single hook and a skirt. The skirt can be made with natural or artificial furs, hair, feathers, and thread to resemble insects, crustaceans, or other prey.

A common component to any fishing lure is color. Some lures include a single color in a simple pattern, while other lures include a multitude of colors—oftentimes in very intricate patterns. As discussed above, it is becoming more common and popular for fishing aficionados to dye their own lures.

The dye pad 100 includes the dye. The dye can be a variety of colors, also including shades, tints, or tones of hues. The colors can be primary, secondary, or tertiary colors and shades, tints, or tones thereof. The color can also be a metallic color. A metallic color is a color that appears to be that of a polished metal.

The dye pad 100 includes a substrate. The substrate can be a plastisol. Plastisols, sometimes referred to as vinyl pastes, are a liquid suspension of polymer particles in a plasticizer. They are generally 100 percent solid pastes or viscous liquids that become a gel upon heating to relatively high temperatures and solidify on cooling to form plastigels. They can be flexible or rigid depending on the type and amount of plasticizer added and give good adhesion to most types of (oiled) metals, plastics, and other substances.

A polymer is a molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A polymer formed from two or more different types of monomer residues is called a copolymer. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

The polymer of the plastisol substrate can be selected from polyvinyl chloride, polymethacrylates, polystyrenes or copolymers comprising monomers selected from vinyl chloride, methacrylates, or styrenes. The plasticizer can be selected from benzoates (e.g., dipropylene glycol benzoate (DPGDB) and triethylene glycol benzoate), phosphates, adipates, sebacates, and alkylsulfonic acid esters.

The plastic polymer and the plasticizers can make up about 60% to 70% of the plastisol formulation. The substrate can include other ingredients. Ground fillers such as calcium oxide and calcium carbonate can be added to achieve non-sag properties. The ground fillers can bind and neutralize hydrochloric acid formed by partial decomposition of the plastisol during production. Other ingredients that may be added include heat stabilizers, acid scavengers, cross-linkers, and secondary plasticizers (hydrocarbon oils).

Plastisols are generally considered very stable at room temperature, but fuse or gel when heated and turn into a homogenous solution at sufficiently high temperatures. The first step is gelation that typically occurs around 50 to 60° C., which converts the plastisol into a semisolid material. As the temperature is further increased, more and more plasticizer penetrates and swells the polymer particles until a point is reached where phase inversion occurs, that is, the dispersed solid polymer particles convert to plasticizer dispersed in a polymer resin—occurring at temperatures around 150 to 210° C. Further heating results in fusion of the particles to a homogenous material.

The substrate can be heated to at least a minimum temperature to cause the plastic polymer particles to dissolve and the substrate to become a gel with an increased viscosity. The substrate can be heated to at least a minimum temperature such that phase inversion occurs and a homogenous material is formed. The dye can be added to the substrate prior to or after heating, but before cooling. The heated substrate and dye can then be cooled to at least a maximum temperature such that a permanently plasticized solid pad is achieved. After the substrate and dye have cooled, the dye is no longer in a liquid form and thus, becomes a "dry" dye. As used herein, the term "dry" in reference to the dye means that the dye is not in a liquid or gel form and as such cannot flow.

According to any of the embodiments, the dye pad 100 is flexible. The concentration of the plasticizer can be selected such that the dye pad 100 is flexible. The dye pad 100 can have a thickness selected such that the dye pad is flexible. By way of example, the thickness for a flexible dye pad can be in the range from 0.25 inches (in.) to 0.75 in. A flexible dye pad can be folded over onto itself wherein the fishing lure 130 can be positioned in between the fold to dye both sides of the fishing lure.

The dye pad 100 can be a variety of shapes and sizes. Dimensions for the dye pad 100 can range from widths or diameters of 0.5 to 6 in., lengths of 0.5 to 9 in., and thicknesses of 0.25 to 4 in. The dye pad 100 can be rectangular, square, circular, or other shapes.

Figure 2:
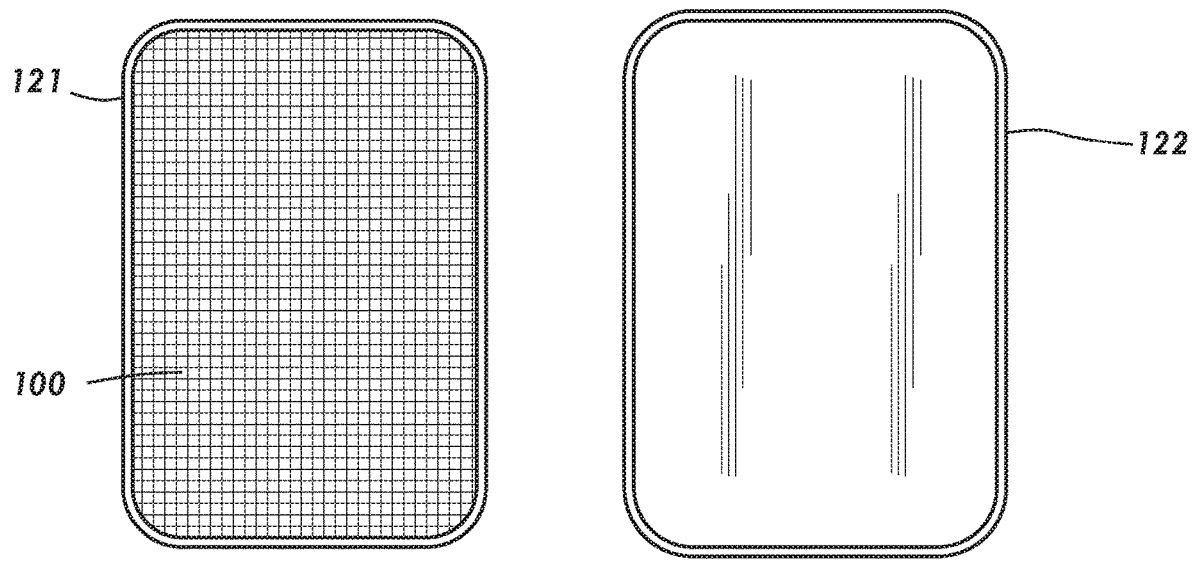
FIG. 2 is a top view of the dry dye pad located in a container with a container lid.

As shown in FIG. 2, the dye pad 100 can be placed within a container. The container can include a container base 121 and a container lid 122. The size and shape of the container can correspond to the size and shape of the dye pad. The container can also be in a clam shape with the container base 121 and the container lid 122 attached to each other via a hinge. The dye pad can also be molded into a variety of different patterns that can be used to dye the lure in that specific color pattern. The dye pad 100 can also be attached to a key chain or clippable fastener. The container can be made from a metal, metal alloy, or rigid plastic.

The dye pad 100 can also be used as a standalone pad without a container. Because the dye will not stain a user's skin, the user does not need to use the dye pad positioned within a container. The dye pad 100 can have a slightly tacky surface. If dirt or debris sticks to the dye pad 100, then a user can simply wash the dye pad 100 off with water to remove the dirt or debris. Washing with water and optionally soap will not adversely impact the performance of the dye.

Figure 3A:
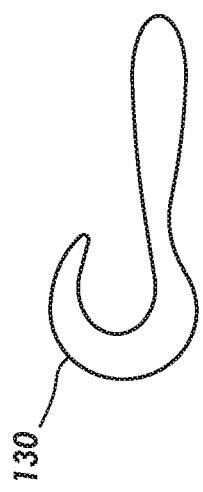
FIGS. 3A, 3B, and 3C are top views of a fishing lure shown prior to dyeing, dyed a first color, and dyed a second color, respectively.
Figure 3B:
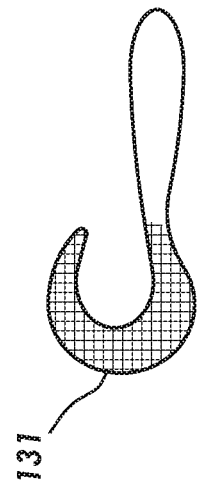
Figure 3C:
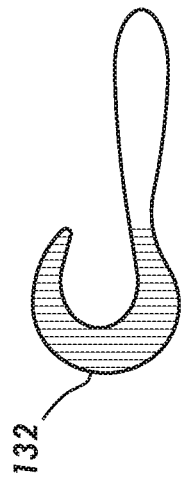

FIG. 3A shows a fishing lure 130 prior to dyeing, a portion of the fishing lure 130 after dyeing a first color 131 shown in FIG. 3B, and a portion of the fishing lure 130 after dyeing a second color 132 shown in FIG. 3C. In practice, a user can place all or a portion of the fishing lure to be dyed on over the dye pad 100. The user then presses down on the fishing lure such that the lure makes contact with the dye pad. The dye pad will transfer the color to the lure in as little as 1 to 3 seconds. For a darker color, the user may press the lure onto the dye pad for longer than 3 seconds. After the dyeing process is complete, the user removes the lure from contact with the dye pad. Of course, the user may dye the same fishing lure multiple times on multiple portions of the lure and using more than one color.

Figure 4:
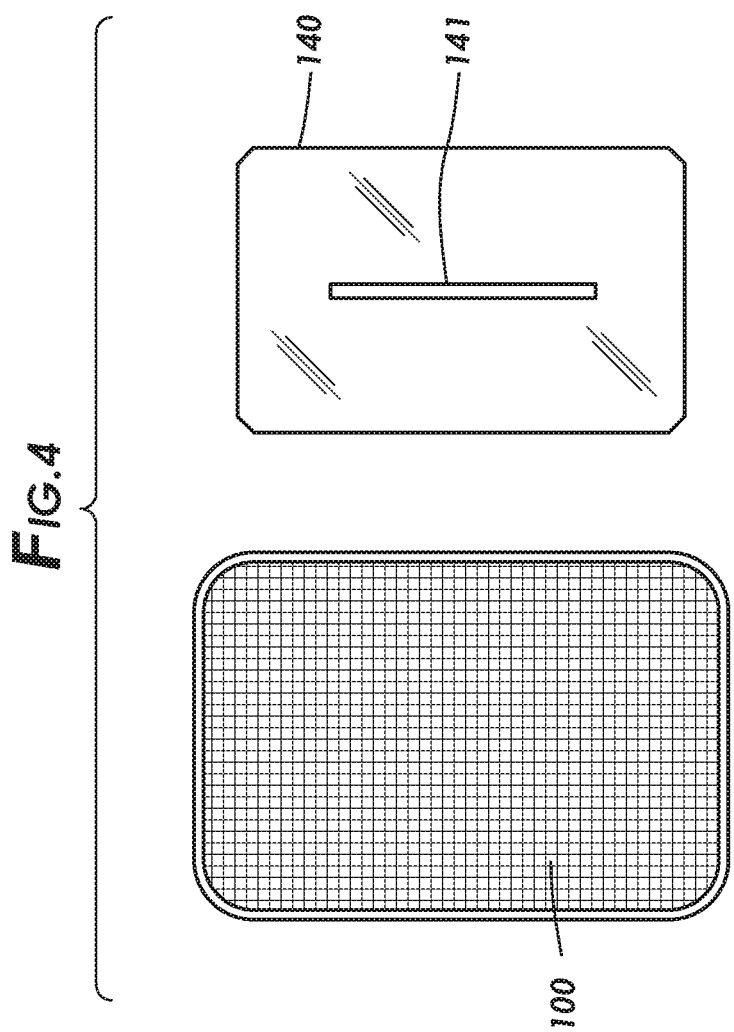
FIG. 4 is a top view of the dry dye pad and a stencil positioned adjacent to the pad.
Figure 5:
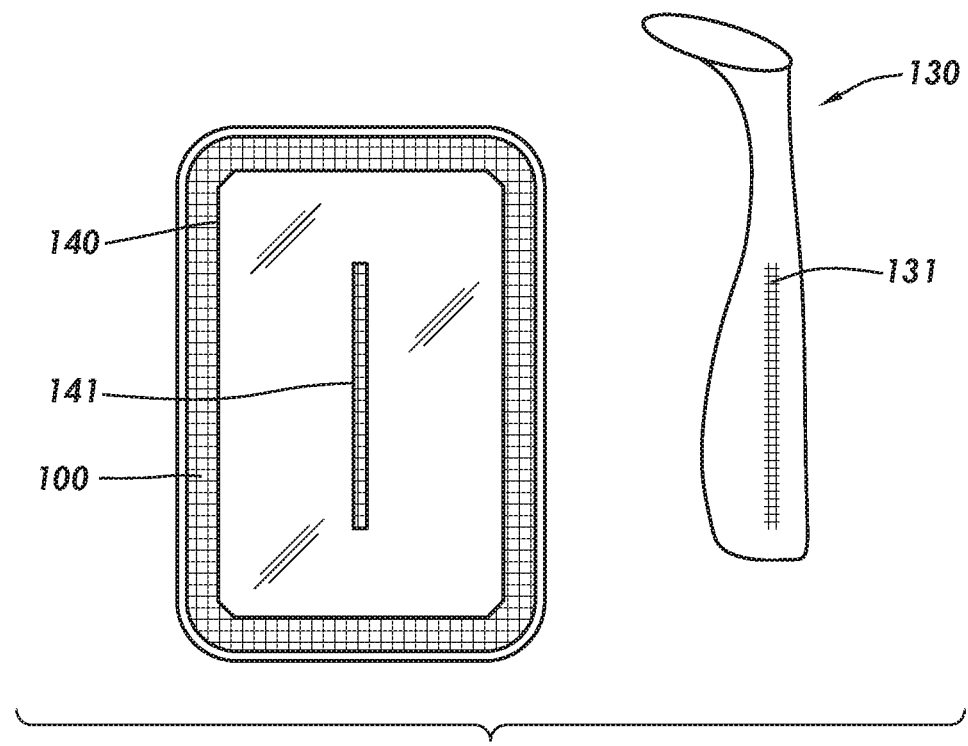
FIG. 5 is a top view of the dry dye pad with the stencil positioned on top of the pad, and a fishing lure dyed in the pattern of the stencil cutout.

As shown in FIG. 4, the dye pad system can also include a stencil 140. The stencil 140 can be made from a variety of materials including, but not limited to, flexible, semi-rigid, or rigid materials such as plastics, paper, cardstock, metals, metal alloys, or cardboard. The stencil 140 can be a solid piece of material with at least a first cutout 141. The stencil 140 can also include a second, third, fourth, etc. cutout (not shown). Any of the cutouts can be in a variety of dimensions and patterns and can include one or more cutout shapes that form the pattern. The stencil 140 can be placed on top of the dye pad 100 as shown for example in FIG. 5. A portion of the fishing lure 130 to be dyed can be placed on top of the cutout and pressed down onto the dye pad 100 to make contact with the dye pad located underneath the cutout. The length of time the lure is held in contact with the dye pad can vary as discussed above. The dye pad 100 shown in FIG. 5 has a first color 131. As can be seen, the first color 131 is transferred to the fishing lure 130 in the pattern of the first cutout 141. The fishing lure 130 can also be dyed a second color 132 using the same dye pad that contains both of the first and second colors or a second dye pad containing the second color. Of course, the fishing lure 130 can also be dyed a third, fourth, and so on color that is different from the other colors to create a realistic lure.

Figure 6:
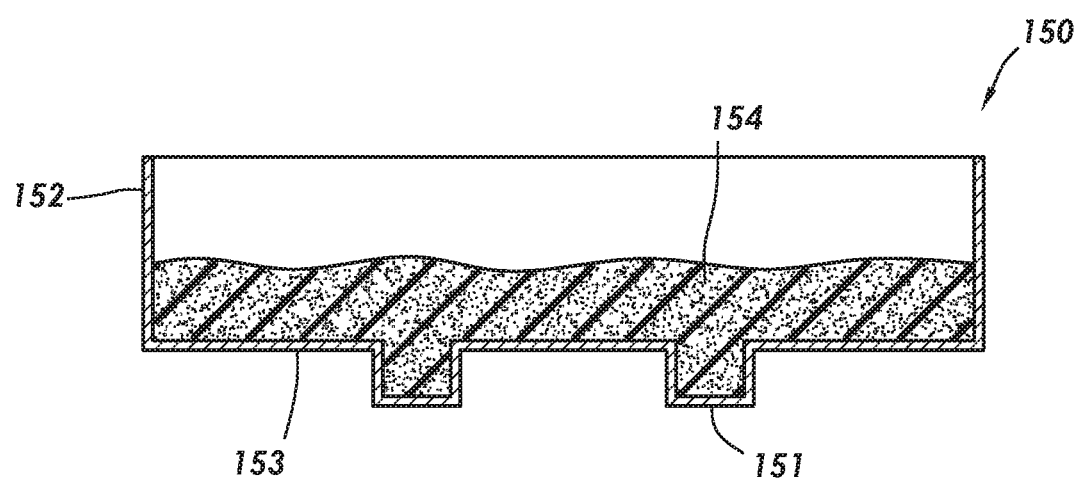
FIG. 6 is a cross-sectional view of a mold for forming the dry dye pad.

FIG. 6 is a cross-sectional view of a mold 150. The dye pad can be prepared by pouring the substrate into a heated or unheated mold 150. The mold 150 can include side walls 152, a bottom 153, a front wall, and a back wall (not shown). The mold 150 can have perimeter dimensions and shape of the desired shape and dimensions of the dye pad 100. The substrate can be in liquid form 154 to be poured into the mold 150. The volume of substrate that is poured into the mold can be selected based on the desired thickness of the dye pad 100. According to any of the embodiments, the substrate, and optionally the dye, can be at a temperature that is above the gelation temperature of the plastisol substrate. Alternatively, the substrate can be at a temperature that is above the phase inversion of the plastisol substrate. The mold 150 can also be heated such that the plastisol substrate reaches the gelation and/or phase inversion temperature. After the substrate reaches the phase inversion temperature, the mold 150 can be cooled or allowed to cool to a temperature below the gelation temperature to form the dye pad 100. Preferably, the dye is added to the substrate prior to cooling of the substrate. The substrate that includes the dye is removed from the mold 150 after cooling.

The mold 150 can be made from a variety of materials. The mold can be made from a material that has a melting point greater than the phase inversion temperature of the plastisol substrate. In this manner, the mold 150 can be heated to the phase inversion temperature without melting and maintains structural integrity. The material can be a metal, metal alloy, or high temperature plastic. Examples of suitable materials for the mold include, but are not limited to, brass, aluminum, bronze, copper, iron, wrought iron, magnesium, stainless steel, tin, and alloys of any of the foregoing. Preferably, the material is selected such that the material does not chemically react with the polymer particles or liquid plasticizer of the substrate—including during the gelation and phase inversion stages of plastisol.

The mold 150 can include one or more vertical partitions (not shown) spanning the entire distance between the front wall and back wall, the side walls, or the diameter and spaced between the outer perimeter. The vertical partitions can create two or more discreet reservoirs for the substrate. A first color 131 dye can be added to the substrate in a first reservoir; while a second color 132 dye can be added to the substrate in a second reservoir. Of course there can be a third, fourth, etc. colored dyes located in a third, fourth, etc. reservoirs within a single mold 150.

The mold 150 can also include one or more grooves 151 that extend downwardly from the bottom 153. The perimeter walls can also be curved upwardly from the bottom 153 as opposed to being at a 90° angle as shown in FIG. 6. A portion of the curved walls can include the one or more grooves 151. The one or more grooves 151 can form a pattern for dyeing the fishing lure 130—much like a bundt cake pan can be used to form a pattern in a baked cake. The dye pad 100 would be inverted after removal from the mold 150 for use. In practice, a user would press the area of the fishing lure 130 to be dyed onto the raised portions of the dye pad 100 that were created by the one or more grooves 151. The pattern formed from the one or more grooves 151 would be transferred to the fishing lure 130 in the color of dye that was added to the substrate. A user can use more than one pattern and more than one color of dye on the same fishing lure. The combinations and options for a user to dye a fishing lure 130 are plentiful.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more colors, dye pads, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a–b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A permanently plasticized solid dry dye pad for dyeing fishing lures comprising:
    a substrate comprising polymer particles and a dye suspended in a liquid plasticizer,
    wherein the substrate forms the permanently plasticized solid after heating and cooling, wherein the dye is a dry dye and is not in a liquid or gel form after cooling, and wherein the dry dye is transferrable to at least a portion of the fishing lure.

2. The dry dye pad according to claim 1, wherein the fishing lure is made from a material selected from the group consisting of soft plastics, hard plastics, silicone, rubber, metal, wood, cork, biodegradable materials, synthetic or natural: hair, fur, feathers, and combinations thereof.

3. The dry dye pad according to claim 1, wherein the dye is selected from shades, tints, or tones of hues.

4. The dry dye pad according to claim 1, wherein the substrate is a plastisol.

5. The dry dye pad according to claim 1, wherein the polymer particles are selected from polyvinyl chloride, polymethacrylates, polystyrenes or copolymers comprising monomers selected from vinyl chloride, methacrylates, or styrenes.

6. The dry dye pad according to claim 1, wherein the liquid plasticizer is selected from benzoates, phosphates, adipates, sebacates, or alkylsulfonic acid esters.

7. The dry dye pad according to claim 1, wherein the substrate further comprises an additional ingredient.

8. The dry dye pad according to claim 7, wherein the additional ingredient is selected from the group consisting of ground fillers, heat stabilizers, acid scavengers, cross-linkers, secondary plasticizers, and combinations thereof.

9. The dry dye pad according to claim 1, wherein the permanently plasticized solid dry dye pad is flexible.

10. The dry dye pad according to claim 1, wherein the permanently plasticized solid dry dye pad has dimensions of a width or diameter in the range of 0.5 to 6 in., a length in the range of 0.5 to 9 in., and a thickness in the range of 0.25 to 4 in.

11. A method of dyeing a portion of a fishing lure comprising:
   contacting at least a portion of the fishing lure with a surface of a permanently plasticized solid dry dye pad comprising:
      a substrate comprising polymer particles and a dye suspended in a liquid plasticizer, wherein the substrate forms the permanently plasticized solid after heating and cooling, wherein the dye is a dry dye and is not in a liquid or gel form after cooling;
   allowing the dry dye to transfer to the portion of the fishing lure; and
   removing the fishing lure from contact with the surface after a period of time has elapsed.

12. The method according to claim 11, further comprising manufacturing the dry dye pad.

13. The method according to claim 12, wherein the substrate is heated to at least a minimum temperature to cause the polymer particles to dissolve and the substrate to become a gel with an increased viscosity and to cause phase inversion to form a homogenous material.

14. The method according to claim 13, wherein the substrate is cooled or allowed to cool to a temperature of 71° F. after heating.

15. The method according to claim 12, further comprising adding the dye, the polymer particles, and the liquid plasticizer to a heated or unheated mold, wherein the mold is rectangular or square in shape and comprises a front wall, a back wall, a bottom, and two side walls or the mold is circular in shape and comprises a side wall and a bottom.

16. The method according to claim 15, wherein the mold further comprises one or more grooves that extend downwardly from the bottom, the mold further comprises one or more vertical partitions, or the mold further comprises the one or more grooves and the one or more vertical partitions.

17. A system for dyeing a portion of a fishing lure comprising:
   the fishing lure; and
   a permanently plasticized solid dry dye pad comprising: a substrate comprising polymer particles and a dye suspended in a liquid plasticizer, wherein the substrate forms the permanently plasticized solid after heating and cooling, wherein the dye is a dry dye and is not in a liquid or gel form after cooling.

18. The system according to claim 17, further comprising a container, wherein the container comprises a container base, and wherein the dry dye pad is located within the container base.

19. The system according to claim 17, further comprising a stencil, wherein the stencil is a solid piece of material comprising at least one cutout.

20. The system according to claim 19, wherein the portion of the fishing lure is dyed in the configuration and dimensions of the at least one cutout.

* * * * *